United States Patent [19]

Blaakmeer et al.

[11] Patent Number: 5,482,549
[45] Date of Patent: Jan. 9, 1996

[54] CEMENT, METHOD OF PREPARING SUCH CEMENT AND METHOD OF MAKING PRODUCTS USING SUCH CEMENT

[75] Inventors: J. Blaakmeer, Eijsden; W. van Loo, Maastricht; P. R. M. Meekels, Puth, all of Netherlands

[73] Assignee: ENCI Nederland B.V., Maastricht, Netherlands

[21] Appl. No.: 222,688

[22] Filed: Apr. 4, 1994

[30] Foreign Application Priority Data

Apr. 5, 1993 [NL] Netherlands ..................... 93200988

[51] Int. Cl.$^6$ ..................... C04B 35/00; C04B 7/02; C04B 7/14; C04B 7/32
[52] U.S. Cl. ..................... 106/606; 106/602; 106/624; 106/705; 106/707; 106/709; 106/714; 106/819; 106/DIG. 1
[58] Field of Search ..................... 106/600, 602, 106/624, 705, 707, 709, 714, 606, 816, DIG. 1, 819

[56] References Cited

U.S. PATENT DOCUMENTS 5,084,102   1/1992   Brouns et al. ..................... 106/705

FOREIGN PATENT DOCUMENTS 0375081   6/1990   European Pat. Off. .
31145     8/1952   Luxembourg .
86 01766  3/1986   WIPO .

OTHER PUBLICATIONS

Kovach, "The Use of Thermal Power Station Pulverzied Fuel Ash in the Manufacture of Cement in Hungary", Delivered, Orally at Symposium at Ankara, Turkey, 1970 p. 4 (no month).
Ducreux et al., "The Effects of Fineness on the Pozzolanic Behavior of Fly Ashes as Additions to Cement", Silicates Ind., 27, Abstract, 1962 (no month).
Chem. Abstracts, 104(12) 94207p, Mar. 24, 1986.
Indian Chemical Manufacturer, 35–39 (1979) (no month).
World Cement Technology 8(6), 223–233 (1987) (no month).
Silicates Industriels 48(3), 79–82 (1983) (no month).
ZKG International, 38(10), 609–611 (1985) (no month).

*Primary Examiner*—Mark L. Bell
*Assistant Examiner*—Michael Marcheschi
*Attorney, Agent, or Firm*—Michael N. Meller

[57] ABSTRACT

A homogeneous dry particulate cement mixture in ready-to-use form is provided, which comprises ground blast-furnace slag having a specific surface area of 500–750 m$^2$/kg and ground fly ash having a specific surface area of 500–750 m$^2$/kg, in a weight ratio in the range of 20/80–70/30, and further comprises the following components in the amounts indicated, calculated on the total mixture: at least 2% by weight of portland cement clinker and 2–12% by weight of sodium silicate (calculated as Na$_2$O+SiO$_2$). When processed, the cement mixture yields a mortar or a concrete having improved strength properties as well as a good resistance against an acidic environment.

9 Claims, 1 Drawing Sheet

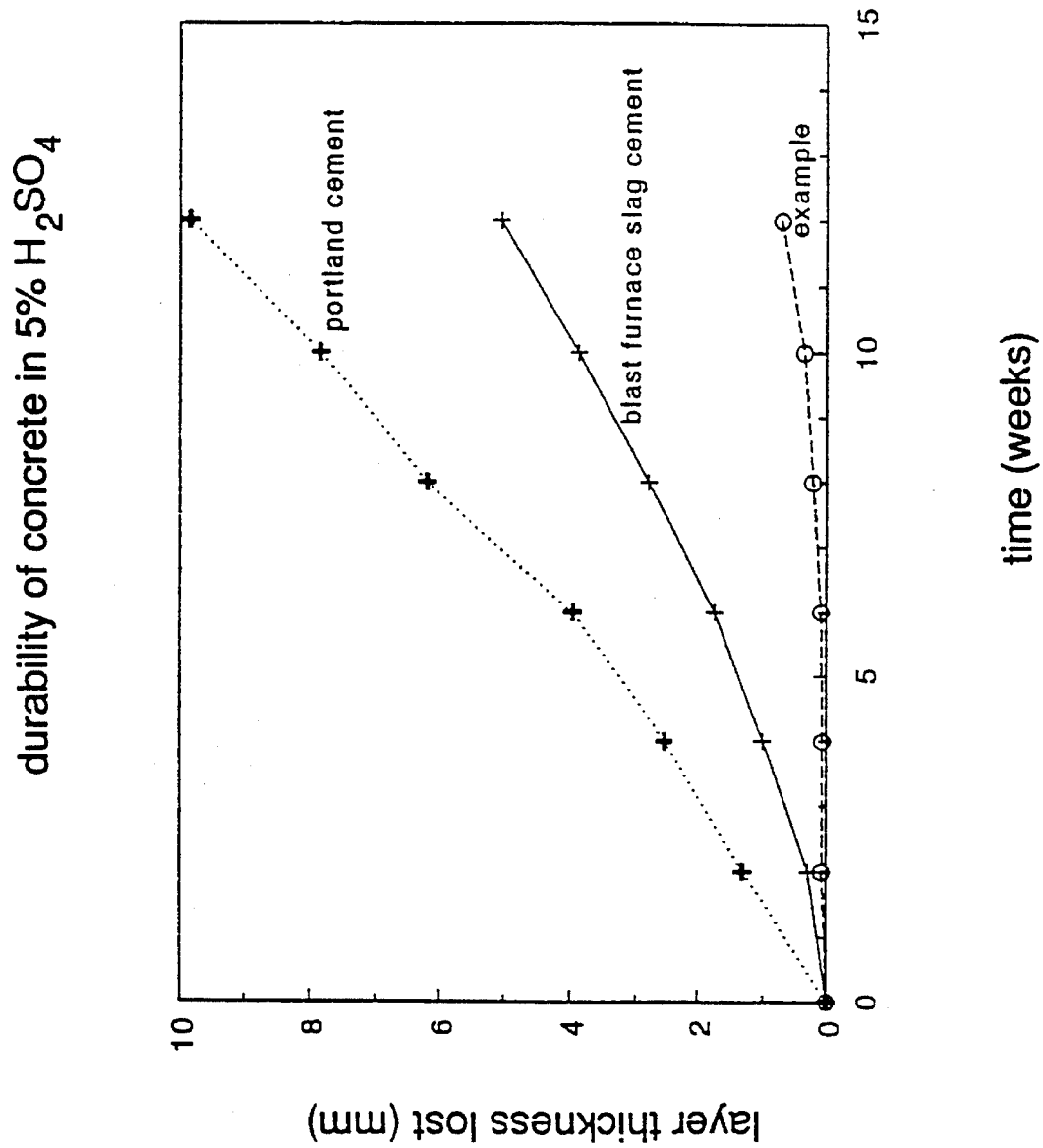

CEMENT, METHOD OF PREPARING SUCH CEMENT AND METHOD OF MAKING PRODUCTS USING SUCH CEMENT

The invention relates to a cement based on blast-furnace slag and fly ash.

From "Journal Soc. Chem. Ind." 9, 191–202 (1940) it is known to activate blast-furnace slag with an alkaline substance to improve its hydraulic properties.

Further, "World Cement Technology" 11/12, 223–233 (1977) reports on an extensive study into the use of cement based on finely ground blast-furnace slag and fly ash in which a solution of sodium hydroxide is used as an activator.

From "Silicates Industriels" 3, 79–82 (1983) a so-called F-cement is known, which yields a concrete of low porosity. The F-cement comprises low-lime silicates, Such as blast-furnace slag and fly ash, and an F additive for activating the silicates. The liquid F additive contains an alkaline substance and, in addition, a lignosulfate as a dispersing agent. Further additives, such as an anti-foaming agent, may also be present.

From LU-A-31,145 it is known to prepare a cement comprising a mixture of fly ash and ground blast-furnace slag. Various additives may be added, such as ammonium sulfate, calcium sulfate, and calcium chloride. Another additive is portland cement in a proportion of 5–10% or an alkaline salt, for instance sodium sulfate or sodium silicate. The mixture described in the Example comprises blast-furnace slag and fly ash in a weight ratio of 65/35, and contains, in addition to other additives, 7% of portland cement. This known cement is claimed to have good strength development characteristics.

In an article by R. C. Maheshwari and D. S. Walia entitled "On the Process Development of SF Cements" in Indian Chemical Manufacturer, 1979, pages 35–39, cement mixtures are reported which comprise ground slag and fly ash in a ratio of about 1:1, to which an activator is added. These known cement mixtures do not contain portland cement clinker. The activators that were tested are sodium hydroxide, sodium silicate, sodium carbonate, and hydrated lime. Only with sodium hydroxide could a moderate strength development be achieved.

EP-A-0 375 081 discloses a homogeneous dry particulate cement mixture in ready-to-use form, which comprises blast-furnace slag having a specific surface area of 500–650 m$^2$/kg and fly ash in a weight ratio in the range of 20/80–60/40, and further comprises the following components in the amounts indicated, calculated on the total mixture:

| portland cement clinker | at least 2 wt. % |
| --- | --- |
| sodium silicate (calculated as Na$_2$O + SiO$_2$) | 2–12 wt. % |

EP-A-0 375 081 mentions that this known cement mixture can be readily handled, has a high storage stability, and, when processed, yields a mortar or a concrete that has good strength properties and offers eminent resistance to the corrosive effects of an acid environment. With respect to the fly ash to be used, EP-A-0 375 081 mentions that the fly ash as such has a specific surface area of about 300 m$^2$/kg, which is qualified as sufficient, so that a grinding treatment can be dispensed with.

BRIEF DESCRIPTION OF THE DRAWING

FIG. 1 is a graph showing the durability of concrete in 5% H$_2$SO$_4$ plotted in terms of the layer thickness loss as a function of time for various cement compositions.

DETAILED DESCRIPTION

It has now been found that an important improvement can be achieved when in a dry particulate cement mixture of the general type described in the preceding paragraph, fly ash is used which has been ground to a high degree of fineness, viz. ground fly ash having a specific surface area of 500–750 m$^2$/kg.

Therefore, according to the invention a homogeneous dry particulate cement mixture in ready-to-use form is provided, which comprises ground blast-furnace slag and further comprises fly ash as well as the following components in the amounts indicated, calculated on the total mixture:

| portland cement clinker | at least 2 wt. % |
| --- | --- |
| sodium silicate (calculated as Na$_2$O + SiO$_2$) | 2–12 wt. %, | this cement mixture being characterized in that the blast-furnace slag has been ground to a specific surface area of 500–750 m$^2$/kg, the fly ash is ground fly ash having a specific surface area of 500–750 m$^2$/kg, and the blast-furnace slag and the fly ash are present in a weight ratio in the range of 20/80–70/30. All specific surface area values given herein and in the appended claims have been determined by the Blaine method according to EN 196-6.

When a cement mixture according to the invention is used for preparing fresh mortar or fresh concrete, the water demand is relatively low, while yet the workability is very good. This relatively low water demand results in high values of both the initial and the final compressive strength of the mortar or concrete made. Finally, it has been found that mortar or concrete obtained by using a cement mixture according to the invention possesses a good resistance to attack by a strongly acidic environment, which is also an object of the inventive cement mixture.

The use of ground fly ash in cement mixtures is known as such from the literature, to be discussed hereinbelow, but the literature is invariably concerned with portland clinker/fly ash cement which is essentially different from blast-furnace slag/fly ash cement, to which relates the present invention. Moreover, the inventive cement mixture is in particular composed with a view to making mortar or concrete exhibiting a good resistance to the corrosive action of an acidic environment.

From "Zement-Kalk-Gips" 10, 609–611 (1985) it is known that some grinding of the fly ash improves the strength development of a portland clinker/fly ash cement. The fly ash is ground preferably together with the clinker and the Blaine fineness reported in the article amounts to about 440 m$^2$/kg.

Further, an article by Z. Giergiczny and A. Werynska entitled "Influence of Fineness of Fly Ashes on their Hydraulic Activity" SP 114-4, published in the Proceedings of the Third International Conference on "Fly Ash, Silica Fume, Slag, and Natural Pozzolans in Concrete" (Trondheim, Norway, 1989), Volume 1, 97–115, reports on the influence of different types of ground fly ash on the chemical resistance and the strength of blended portland cements. From the test results it appears that the strength increases with increasing fineness of the ground fly ash, but decreases again when the specific surface area exceeds 543 m$^2$/kg and 559 m$^2$/kg, respectively.

An article by H. C. Alsted Nielsen, F. L. Smidth et Co. entitled "Preparation of Fly Ash Cements" in "FLS Review 32", 1979, pages IV-72–IV-77 teaches that a decrease in compressive strength, when using a ground mixture of portland clinker and fly ash, can be partly compensated for by finer grinding. The fly ash can also be ground separately, but the highest specific surface area reported in the article is 500 m²/kg according to the Blaine method.

Finally, reference is made to an article in "Magazine of Concrete Research" 35, no. 124, 131–141 (1983). In this article, a comparison is made between intergrinding and blending in making portland/fly ash cement mixtures. Test results indicate that a finest possible fly ash is to be used if portland/fly ash cements are to be prepared by blending. However, a fineness exceeding about 400 m²/kg is not investigated in this article.

For the composition of the present cement, abundantly available industrial by-products and waste materials are used, in particular granulated blast-furnace slag and powdered coal fly ash. Generally, there is little limestone involved, which considerably slows down the exhaustion of this natural raw material. Moreover, a substantial amount of energy is saved in this way, since the processing of limestone into portland cement clinker, from which portland cement is prepared, takes a lot of energy. The present cement mixture can be stored for a long time and can readily be mixed with water and the conventional aggregates to form a mortar or a concrete that has a good initial Strength and exhibits a favourable strength development. The present cement mixture is in particular intended for the production of mortar or concrete constructions, products or parts which will be exposed to strongly acid environmental conditions for long periods of time. Examples of such constructions, etc., are sewage treatment plants, sewage pipes, silos for storing feed, cattle shed and pigsty floors and elements for such stable floors, constructions for manure storage, etc. Such strongly acid environmental conditions where the pH is 1–2 are more and more of a problem today, and mortar or concrete made from the types of solid cement that are commercially available at present cannot long enough withstand such aggressive environmental conditions. Indeed, after only a few years such mortar or concrete may well be corroded beyond repair.

The starting materials for the composition of the present cement are known per se. Blast-furnace slag is a residual product of the production of pig iron and mainly consists of compounds of lime with silicic acid, aluminum oxide and magnesium oxide. If necessary, the blast-furnace slag is first dried and then, still in dry form, it is ground to the desired fineness, which for the present purpose corresponds to a specific surface area of 500–750 m²/kg. The rule says that a greater initial strength is achieved according as the specific surface area is larger. This is relevant with a view to the removal of the formed concrete products from the molds. A greater initial strength permits earlier removal of the formed products, whereafter the molds can be used again for making new products. A specific surface area below 500 m²/kg does not result in an acceptable final strength, whereas a specific surface area above 750 m²/kg can hardly be realized by dry grinding on an industrial scale at a reasonable energy consumption. Blast-furnace slag has so-called latent hydraulic properties, which means that an activator is required to activate those properties. Solid sodium silicate, to be incorporated in the cement, functions as an activator, in combination with the portland cement clinker.

The use of fly ash is also known in the cement industry, as has been discussed above. A preferable source of fly ash for use according to the invention is fly ash which has been recovered from combustion gases of coal burning in power plants. If these are fuelled with powdered coal, powdered coal fly ash is produced, but if fuelled with brown coal, brown coal fly ash is produced. Fly ash mainly consists of silicon oxide, aluminum oxide, iron oxide, and calcium oxide. Fly ash has pozzolanic properties, which means that an activator is indispensable. For use according to the invention the fly ash is ground to a fineness which corresponds with a specific surface area of 500–750 m²/kg and preferably of at least 600 m²/kg. The grinding can be carried out in conventional equipment such as a ball mill.

Portland cement clinker is prepared according to known procedures. The portland cement clinker is ground fine to a specific surface area which for the present purpose is preferably at least 300 m²/kg and more preferably 500 m²/kg or more. The portland cement clinker promotes the initiation of the hydration process and the initial strength development. This is important with a view to rapid demolding. The presence of portland cement clinker is more necessary according as the weight ratio of blast-furnace slag to fly ash is smaller, for instance 55/45 or less, and according as the blast-furnace slag is less fine. The portland cement clinker is preferably used in an amount of 2–15% by weight and more preferably in an amount of 2–6% by weight. Using more portland cement clinker than is necessary results in a decrease of the resistance of the mortar or the concrete to a strongly acidic environment.

Solid dry sodium silicate in particulate form is an essential component of the present cement mixture because the sodium silicate activates both the blast-furnace slag and the fly ash when the fresh mortar or concrete is prepared with inter alia water. The sodium silicate initiates the hydration of the slag and the fly ash, thus enabling the reaction forming water-insoluble products to take place. Sodium silicate not only has the activating or initiating function just described, but also takes part in the hardening process itself, i.e. in the reactions involved therein. It is important for the sodium silicate to be readily soluble in water to permit an efficient activation of the blast-furnace slag and the fly ash to take place within acceptable time limits for preparing the fresh mortar or concrete. Preferably a sodium silicate is used having an $SiO_2/Na_2O$ ratio that is within the range of 0.8–1.2. Good results are obtained with sodium silicate than also contains water of crystallization. Any water of crystallization that is present has been discounted in the specification of the amount of sodium silicate to be used in the present cement (2–12% by weight). Preferably hydrated sodium silicate is used in the form of particles or granules that have a size of 0.2–2.0 mm, are stable in the air, and do not give off dust when the cement is prepared and handled. Thus the risk of irritation due to handling by human beings is reduced to a minimum.

All kinds of additives for regulating the workability and the water demand can be incorporated according to need. Calcium sulfate can be mentioned as an example of an additive for regulating the setting time of the fresh mortar or concrete prepared. Calcium sulfate of various origins can be used. Preferably calcium sulfate is used which comes from industrial processes, for instance the desulphurization of flue gas from power plants, the preparation of phosphoric acid, or the preparation of hydrogen fluoride. The point is that such calcium sulfate is available in great quantities and for the present purpose it can be ground together with the blast-furnace slag, the fly ash and/or the portland cement clinker. The calcium sulfate need not really be ground because it has a suitable fineness of itself. During the grinding process the lumps of calcium sulfate are actually just pulverized, and the fine particles are mixed with the blast-furnace slag, the fly ash and/or the portland cement clinker. If wet calcium sulfate is used, this sulfate will also be dried during the grinding process.

The present cement can be prepared by grinding separately, or together in part or in whole, those components that need to be ground because they do not have the desired fineness. In case two or more components are ground together, e.g. blast-furnace slag and fly ash or, according to a preferred embodiment, blast-furnace slag, fly ash and portland cement clinker, which co-grinding treatment can also be referred to as simultaneous grinding or intergrinding, the inventive fineness requirement, corresponding with a specific surface area of 500–750 m²/kg, applies to the ground mixture of components.

Subsequently, the cement is composed by putting together the ground components, the activator and optional additional components and carrying out a mixing treatment in order to obtain the ready-to-use homogeneous particulate cement. The mixing treatment can be carried out in known industrial mixers for fine, dry substances, such as mixed feed, artificial fertilizers, dry cement mortars and the like. By mixing at a temperature of 40° C. or less it is ensured that the water of crystallization of the hydrated sodium silicate is retained. The various components are mixed in the proportions indicated above, but preferably the ratio of blast-furnace slag to fly ash is within the range of 30/70–55/45 (the larger the relative amount of fly ash, the larger the acid-resistance of the products made with the cement) and the other components are used in the following proportions:

| | |
|---|---|
| cement clinker | 2–6 wt. % |
| sodium silicate (calculated as $Na_2O + SiO_2$) | 2–7 wt. % |

Then the mixture is ready for use.

The present cement is usually factory-processed, and thus thoroughly mixed with water and all kinds of aggregates varying from sand having a minimum size of about 0.1 mm to gravel having a maximum size of about 32 mm, of course depending on the products one wishes to make. The fresh mortar or concrete can then for instance be introduced into suitable molds, which have optionally been treated with a suitable mold-release oil.

Characteristic of the present cement is the fact that little water is required—as will be explained in more detail below—so that a mortar or concrete can be produced which has a low porosity, which probably contributes to the improved resistance against acid attack.

The present cement is further characterized by a very low heat of hydration, which makes it well suitable for use in mass concrete applications without the need of rather complex cooling means, which are unavoidable when a conventional cement is used which does not contain an added alkaline activator, in this case sodium silicate.

Due to the portland cement clinker and the fineness of the blast-furnace slag and the ground fly ash, a sufficiently high initial or threshold strength is achieved rapidly, so that demolding can be carried out relatively soon and the molds can be used again. Typically, after 1 day the initial strength is sufficiently high to permit demolding and further handling. It is recommendable to subsequently keep the formed product humid for some time to ensure a good strength development during hardening. The product thus obtained has a very good final strength (after 28 days).

As noted above, to make a fresh mortar or concrete with the present cement, only a relatively small amount of water is required. When making a fresh mortar, the proportion of water required in the application of the known dry types of cement, expressed as the ratio of water to cement, is about 0.5, whereas in the application of the present cement a considerably smaller water/cement ratio of only 0.35–0.45 is sufficient. When making a fresh concrete for the purpose of making sewage pipes this ratio is about 0.4 for a known dry type of cement, and is in the range of only 0.25–0.35 when using the present cement. Owing to the low proportion of water and to cement-chemical factors, a hardened product of low porosity is obtained. This physical characteristic is probably one of the factors that account for the high durability of the hardened products in a strongly acid environment. It goes without saying that this hypothesis regarding the acid-resistance obtained is given without prejudice to the present invention and the rights claimed herein.

In view of its particular characteristics as described above, the present cement is to be looked upon primarily as a ready-to-use dry cement that is particularly intended for the production of mortar or concrete constructions and products which by the nature of their application must be resistant against the corrosive effects of strongly acid environmental conditions as long and as effectively as possible. A number of examples of such applications—illustrating but not limiting the invention—have been mentioned above.

However, in view of the good strength characteristics of the mortar or concrete constructions produced, as has been discussed above and as will become apparent from the results in the Examples hereinafter, the present cement can also be intended primarily for use in making such strong constructions.

The invention will now be illustrated in and by the following Examples.

EXAMPLES AND COMPARATIVE EXAMPLES

Blast-furnace slag, fly ash and portland cement clinker were ground separately until the specific surface area values specified for the slag, the fly ash and the portland cement clinker, respectively, were achieved. Then the particulate components specified in the Table below were homogeneously mixed in the specified amounts at a temperature below 40° C. to form ready-to-use cements.

Each of the cements thus prepared was then mixed with standard sand (in accordance with EN 196-1) and water to form a fresh mortar comprising 450 parts by weight of cement to 1350 parts by weight of sand, the water/cement ratio of each mortar being specified in the Table. The flow values of the fresh mortars obtained are also specified in the Table. From the various fresh mortars, blocks were made measuring 40×40×160 mm, which were removed from the molds after 1 day and were then conditioned up to the 28th day inclusive at 20° C. and a relative humidity above 95%.

The compressive strength of the test pieces was determined after 1 day and after 28 days. After 28 days of hardening, the finished test pieces were cut into pieces measuring 40×40×16 mm and immersed in a sulphuric acid solution to investigate their durability in a strongly acidic environment in terms of the thickness of the layer of mortar which has been lost at one exposed surface of the test pieces. The compressive strength values and the lost layer thickness that were found are specified in the Table below.

For the purpose of further comparison, the same tests were carried out using a commercially available blast-furnace cement (Hofanorm manufactured by ENCI, Maastricht, The Netherlands).

TABLE

| | Comparative examples | | Examples | |
|---|---|---|---|---|
| | 1 (Enci Hofanorm) | 2 | 1 | 2 |
| ground blast-furnace slag | | | | |
| weight % | ca. 65 | 30.2 | 30.2 | 35.1 |
| specific surface area (m²/kg) | * | 625 | 625 | 625 |
| fly ash | | | | |
| weight % | — | 56 | 56 | 52.6 |
| specific surface area (m²/kg) | — | 300 | 702 | 702 |
| ground portland cement clinker | | | | |
| weight % | ca. 35 | 5.2 | 5.2 | 4.4 |
| specific surface area (m²/kg) | * | 500 | 500 | 500 |
| Na₂SiO₃·5H₂O (0.6–2.0 mm) | | | | |
| weight % | — | 8.6 | 8.6 | 8.9 |
| weight % calculated as Na₂O + SiO₂ | — | 5.2 | 5.2 | 5.4 |
| water/cement ratio | 0.50 | 0.42 | 0.39 | 0.39 |
| flow of the mortar (mm) (DIN 18555) | 175 | 163 | 160 | 160 |
| compressive strength of test piece (N/mm²) (EN 196-1) | | | | |
| after 1 day | 5.4 | 3.4 | 16.0 | 13.4 |
| after 28 days | 52.7 | 27.2 | 38.6 | 42.9 |
| thickness of the layer of mortar lost after 28 days' immersion in a 5% H₂SO₄ solution (mm) | 4.1 | 0.9 | 0.6 | 0.7 |

*The specific surface area of Enci Hofanorm blast-furnace cement - prepared by intergrinding - is 430 m²/kg.

The results reported in the above Table show that by increasing the fineness of the fly ash, the water demand of the mortar is reduced and the strength development is substantially improved (the initial as well as the final strength values are much higher). Moreover, the durability in a strongly acidic environment has increased slightly.

The dry cement mixture according to Example 2 was used for the production of sewage pipes. For that purpose it was mixed with aggregates having different sizes and with water to prepare a fresh concrete. The mixing ratios were 400 kg of cement, 786 kg of sand (≦4 mm), 629 kg of aggregate (≦8 mm), and 332 kg of aggregate (≦16 mm) per 1 m³ of fresh concrete. The water/cement ratio was 0.31. After the sewage pipes had been stored for 3 months, they were tested for durability in a strongly acidic environment. For this purpose a piece of concrete was sawn off a sewage pipe and was submerged in a stirred solution of 5% $H_2SO_4$. This solution was used in an amount of 10 ml/cm² concrete surface area. After two weeks the piece of concrete was taken from the solution and brushed in order to remove loose parts. The thickness of the layer lost was calculated from the loss of mass and the respective value was plotted as a function of time in the accompanying Figure. While using a fresh solution of 5% $H_2SO_4$ the test was repeated several times under the same conditions and for two weeks in each case.

For the purpose of comparison, pieces of concrete from sewage pipes produced with commercially available blast-furnace slag cement and commercially available portland cement, respectively, were tested in the same manner. These cements were also used in an amount of 400 kg per 1 m³ of fresh concrete, while an optimized mixture of the several aggregate materials identified above was used. The water/cement ratio of the fresh concrete was 0.4. The results obtained are also shown in the accompanying Figure.

What is claimed is:

1. A homogeneous dry particulate cement mixture in ready-to-use form, which comprises ground blast furnace slag, fly ash and the following components in amounts based on the total weight of the mixture: at least 2 wt. percent portland cement clinker and 2–12 wt. percent sodium silicate (calculated as $Na_2O+SiO_2$), wherein the ground blast furnace slag has a specific surface area of 500–750 m²/kg, the fly ash is ground fly ash having a specific surface area of 500–750 m²/kg, and the ground blast furnace slag and the fly ash are present in a weight ratio in the range of 20/80–70/30.

2. A cement mixture according to claim 1, wherein the ground blast furnace slag and the fly ash have a specific surface area of at least 600 m²/kg.

3. A cement mixture according to claim 1, wherein the portland cement clinker is present in an amount of 2–15 wt. percent.

4. A cement mixture according to claim 1, wherein the weight ratio of the ground blast furnace slag to the fly ash is within the range of 30/70–55/45, and the remaining components are present in the following amounts: 2–6 wt. percent portland cement clinker and 2–7 wt. percent sodium silicate (calculated as $Na_2O+SiO_2$).

5. A cement mixture according to claim 1, wherein the sodium silicate is stable in air, readily soluble in water and has a $SiO_2Na_2O$ ratio within the range of 0.8–1.2.

6. A cement mixture according to claim 5, wherein the sodium silicate contains water of crystallization.

7. A cement mixture according to claim 6, wherein the sodium silicate comprises particles having a size of 0.2–2.0 mm.

8. A cement mixture according to claim 1, wherein the portland cement clinker has a specific surface area of at least 300 m²/kg.

9. A concrete mix comprising the cement mixture of claim 1, water and aggregates.

* * * * *